United States Patent [19]

Witmore et al.

[11] Patent Number: 4,493,073
[45] Date of Patent: Jan. 8, 1985

[54] MAINTENANCE OF STORED PROGRAM CONTROLLED SWITCHING SYSTEMS

[75] Inventors: Ronald K. Witmore, Lafayette; Jerome J. Zelenski, Broomfield, both of Colo.

[73] Assignee: AT&T Bell Laboratories, Murray Hill, N.J.

[21] Appl. No.: 413,156

[22] Filed: Aug. 30, 1982

[51] Int. Cl.³ .............................................. H04J 3/14
[52] U.S. Cl. ........................................ 370/14; 370/13
[58] Field of Search ........................... 370/13, 15, 14; 179/175.2 R

[56] References Cited

U.S. PATENT DOCUMENTS

| | | | |
|---|---|---|---|
| 3,609,704 | 9/1971 | Schurter | 364/200 |
| 3,920,920 | 11/1975 | Lager et al. | 370/13 |
| 4,149,038 | 4/1979 | Pitroda et al. | 370/14 |
| 4,195,206 | 3/1980 | Baichtal | 370/14 |
| 4,296,492 | 10/1981 | Hafer | 370/14 |
| 4,402,074 | 8/1983 | Cupuis et al. | 370/14 |

OTHER PUBLICATIONS

IECI 1978 Proceedings, Mar. 20-22, 1978, "Signature Analysis-Enhancing the Serviceability of Microprocessor-Based Industrial Products", pp. 68-76.
ISS Switching Journal CIC Montreal, Sep. 21-25, 1981, "An Experimental Digital Switch for Data and Voice", pp. 1-7.
IEEE Transactions on Computers, vol. C-31, No. 1, Jan. 1982, "Design for Testability-A Survey", pp. 2-15.
Bell System Technical Journal, Sep. 1964, "No. 1ESS Maintenance Plan", pp. 1961-2019.
Hewlett-Packard Journal, May 1977, "Signature Analysis: A New Digital Field Service Method", pp. 2-8.
Hewlett-Packard Journal, May 1977, "Signature Analysis-Concepts, Examples, and Guidelines", pp. 15-21.

Primary Examiner—Douglas W. Olms
Attorney, Agent, or Firm—Howard R. Popper; Ronald D. Slusky

[57] ABSTRACT

A time division, digital switching system capable of performing on-line testing of the actual communications paths that are switched is disclosed. When an idle network time slot is found, a test vector register places a stimulus in the idle time slot and the stimulus is directed to the address of an idle port. A loop-around path which includes a signature analysis chip (SAC) device is activated to divert a portion of the stimulus toward the SAC device. The response of the SAC device is gated to a maintenance circuit which reads the generated signature. Advantageously, the stimulus is selected to generate minimum noise at the addressed port so that if the user at the idle port picks up the telephone during the time slot used for testing, no loud noise will be heard.

13 Claims, 7 Drawing Figures

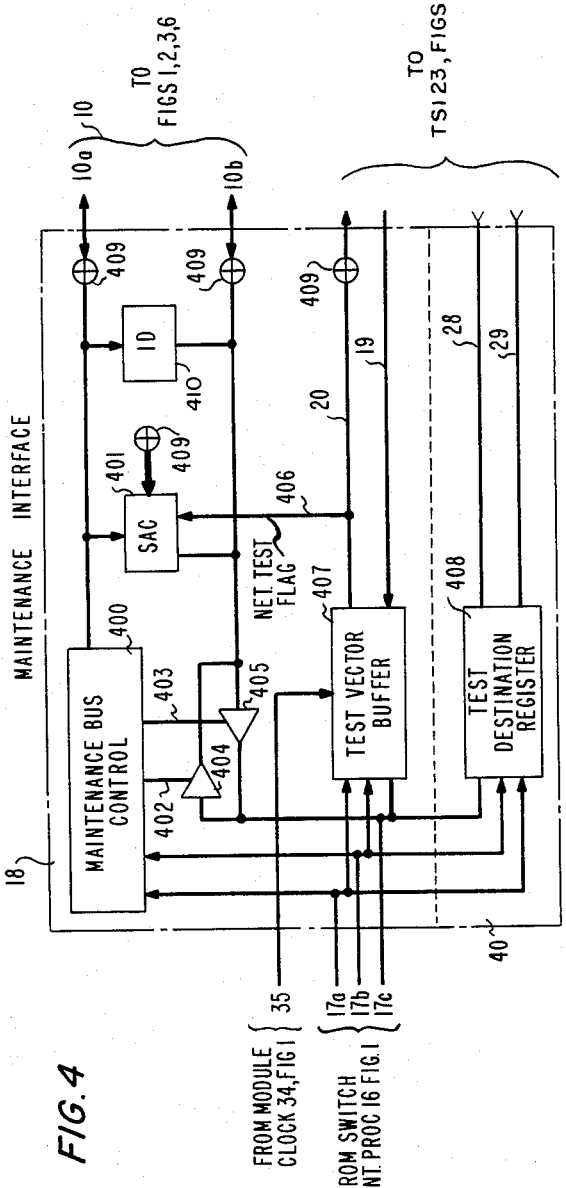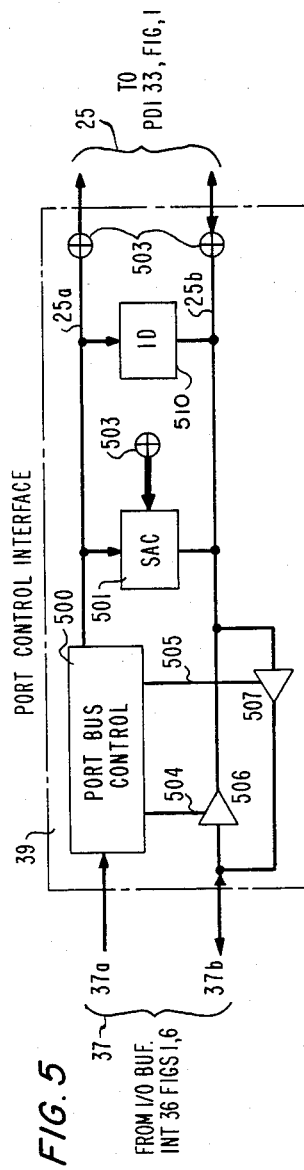

MAINTENANCE OF STORED PROGRAM CONTROLLED SWITCHING SYSTEMS

FIELD OF THE INVENTION

This invention relates to communication switching systems and more particularly to the real time maintenance of stored program controlled switching systems.

BACKGROUND OF THE INVENTION

To assure reliability of operation, stored program controlled telephone switching systems are conventionally designed to employ some degree of on-line maintenance testing as part of the switching control function as well as off-line diagnostic testing to locate the source of trouble once a unit has been taken out of service. An early system of this type is the No. 1 ESS described in the September 1964 issue of the *Bell System Technical Journal*. That system's maintenance plan, described at pp. 1961-2019, included duplicated main processors, each of which performed a number of classes of base level work. Maintenance testing of the duplicated processors was periodically performed in class E of the base level wherein the states of corresponding internal processor nodes were compared either on a routine basis or on a directed or sampled mode basis under program control. Maintenance of the network, however, was limited to checking that one and only one path selection relay operated in the on-line one of the duplicated network controllers, i.e., no direct checking of a network path itself could be accomplished.

Another example of the use of on-line maintenance followed by off-line diagnostic testing is shown in W. Schurter U.S. Pat. No. 3,609,704 issued Sept. 28, 1971. In that patent a diagnostic routine is described for isolating a "babbling" memory store from among a plurality of memory stores accessible over a common address bus.

Recently, a useful technique for off-line diagnosis has been developed employing an iterative encoding device known as a signature accumulating chip (SAC) device. See, for example, E. White, "Signature Analysis--Enhancing the Serviceability of Microprocessor-Based Industrial Products," *IECI '78 Proceedings*, pp. 68-76; R. A. Frohwerk, "Signature Analysis: A New Digital Field Service Method," *Hewlett-Packard Journal*, May 1977, pp. 2-8; and H. J. Nadig, "Signature Analysis-Concepts, Examples and Guidelines", ibid, pp. 15-21. The operation of the SAC device is premised upon the provision of a predetermined stimulus to a circuit or series of circuits which terminate at the SAC device. When the SAC device has had an opportunity to respond to the stimulus, the SAC device is connected to a register and the contents of the register compared with an anticipated response word. If all of the intervening circuitry operates correctly, an equal comparison should result. The nature of any disagreement between the register and the anticipated response word can be indicative of the nature of the fault giving rise to the disagreement. Because the SAC device requires a predetermined stimulus to elicit an anticipated response whereas the stimuli (voice or data messages) traversing communications switching network paths are generally not predictable, it has not heretofore been possible to employ SAC chip devices to perform on-line testing of communications switching paths.

BRIEF SUMMARY OF THE INVENTION

We have discovered a technique whereby SAC devices may be employed for on-line testing of the communications and control paths in a communication switching system. In the illustrative embodiment the SAC devices are employed in a PBX having a time division digital network which advantageously may be of the type described by R. D. Gordon, H. G. Alles and G. D. Bergland in the article entitled "An Experimental Digital Switch for Data and Voice," *ISS '81 CIC*, Montreal, 21-25 Sept. 1981, Session 21B, Paper 3. In such a system, pulse code modulation (PCM) "mouth" samples are collected from a plurality of voice or data source port circuits, double buffered into and out of a time slot interchanger and conveyed as "ear" samples to the destination port circuits. The switching function is executed as a series of memory-to-memory "move" instructions that may address any memory cell within the address space of the time slot interchanger. When port circuits A and B have messages for each other, the messages are collected during port circuit A's and B's respective time slots in one frame and may be delivered to port circuits B and A, respectively during their respective time slots in a subsequent frame. If both port circuits A and B are idle, an idle code is delivered to port circuit A and B, the idle code being a pattern which will generate no noise.

It is an aspect of the operation of the illustrative embodiment implementing the principles of our invention that routine maintenance of network switching paths may be accomplished whenever address space within the time slot interchanger is available and a port circuit is idle. Maintenance circuitry inserts a special test vector into the available address space (idle network time slot) of the time slot interchanger and also enters therein the address of the idle port circuit as destination. A flag accompanying the test vector, sometimes hereinafter called the network test flag, activates SAC devices distributed along the network path taken by the test vector (i.e., the same path that would be taken by a voice or data sample from one of the port circuits) as well as along address and control paths that would be activated to guide the sample along the network path. The SAC devices are connected to a maintenance path that may be read at an appropriate time by maintenance software. In addition, the network test flag activates a loop-around path ahead of the addressed port circuit to divert the test vector toward the time slot interchanger's input buffer which would normally gather input samples from the addressed idle port. The time slot interchanger then conveys the recovered test vector to a destination register in the maintenance circuitry where any desired analysis may be accomplished. When the test vector returns to the test destination register the SAC devices that have responded may be read by maintenance software in the control processor to compare the obtained "signatures" against the expected signatures.

BRIEF DESCRIPTION OF THE DRAWING

The foregoing and other objects and features of our invention may become more apparent from the ensuing description when read together with the drawing, in which;

FIGS. 2 through 6, respectively, show details of the location and operation of the signature accumulating devices of the port data store, time slot interchanger, maintenance interface, port control interface and input/output buffer interface circuits shown generally in FIG. 1.

GENERAL DESCRIPTION

Figure 1:
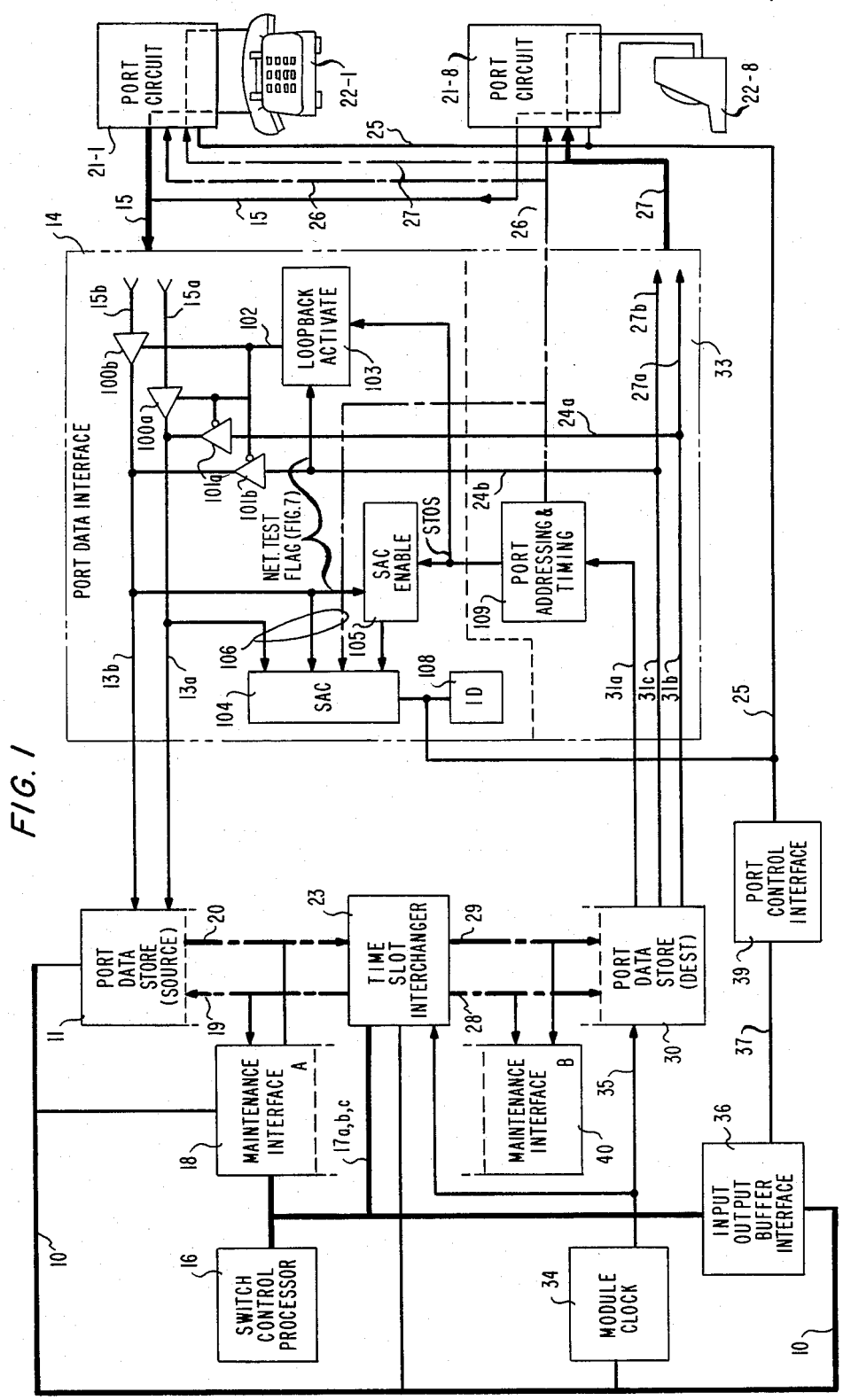
FIG. 1 is a general block diagram of an illustrative switching system having a signature accumulating device arranged for on-line maintenance.

Referring now to FIG. 1, there is shown at the right a group of terminal devices 22-1 through 22-8 each associated with a respective port circuit 21-1 through 21-8. Each such terminal device may comprise either a telephone or a digital terminal equipment (DTE). A switching network comprising a time slot interchanger 23 operating under control of switch control processor 16 controls the establishment of connections among the plurality of port circuits 21. Among other circuit functions not necessary to be discussed in detail, a port circuit serving an analog telephone set contains circuitry for converting analog voice samples to digital (PCM) signals for switching through time slot interchanger 23, and vice versa. A port circuit serving data terminal equipment contains the appropriate circuitry for administering the well-known EIA interface functions. The port circuits will hereinafter be generically referred to as port circuits 21.

Each group of eight port circuits such as 21-1 to 21-8 is connected to the input portion 14 of a respective port data interface. The port data interface has been shown as divided into separate portion 14 and 33 to facilitate description. A PCM path 15 connects the input portion 14 and a PCM path 27 connects the output portion 33 to the port circuit 21.

Path 15 provides the input portion 14 of port data interface with incoming digitally encoded (PCM) voice or data ("mouth") samples to be switched to some other port circuit. One sample is transferred from each port to path 15 during each sampling frame under control of timing and port addressing signals delivered over control path 26 by port addressing and timing circuit 109. Port circuits 21 receive PCM voice or data ("ear") samples from outgoing portion 33 of the port data interface over path 27.

PCM samples from the port circuits 21 are conveyed from port data interface 14 to the source portion 11 of a port data store wherein each sample is stored in a dedicated location. Although only one port data interface and only one port data store are shown to avoid unduly complicating the drawing, it should be understood that time slot interchanger 23 will normally serve a plurality of such units. In an illustrative embodiment a single switch "module" may comprise up to six port data stores each serving four port data interfaces accommodating in all 1536 port circuits. A plurality of such modules may be interconnected by dedicating address space in the time slot interchanger's program store (i.e., network time slots) for connection to a time multiplexed switch (not shown).

Time slot interchanger 23 is provided by switch control processor 16 with instructions to address designated ones of the source locations in port data store 11 during each frame and to transfer the sample (in parallel) to desination location in port data store 30. Time slot interchanger 23 addresses "source" port data store 11 over path 19, receives the sample over path 20 and sends the sample on (after modification) over data path 29 to a destination address in destination port data store 30, at the address indicated on path 28.

Figure 7:
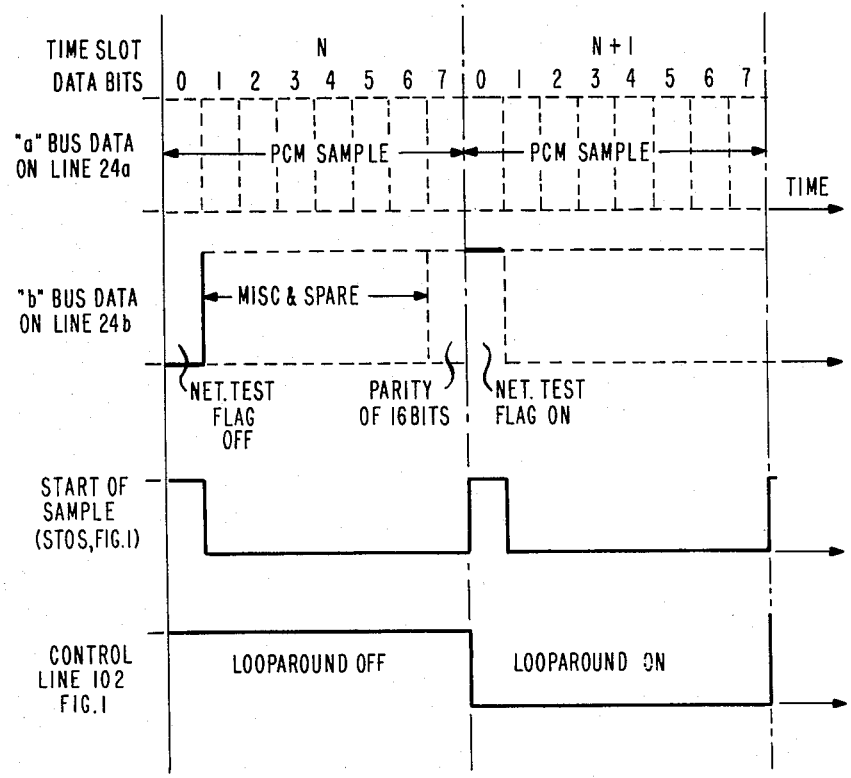
FIG. 7 shows relevant waveforms, including the network test flag.

During a frame (125 microseconds) of normal call traffic, the data stream at port data interface input portion 14 consists of one serially incoming 16-bit sample per port (see FIG. 7) arriving over path 15. Each 16-bit incoming sample consists of 2 bytes traveling serially over separate parallel paths 15a, 15b. Simultaneously, at port data interface output portion 33, a 16-bit outgoing sample is dispatched to the port over path 27. Each 16-bit outgoing sample consists of two bytes traveling serially over separate parallel paths 27a, 27b. The "a" bytes on paths 15a and 27a contain the PBX user's data or PCM voice sample. The "b" bytes on paths 15b and 27b contain miscellaneous signaling or spare bits, a parity bit assigned for odd parity over both the "a" and "b" bytes and, in accordance with one aspect of our invention hereinafter to be more fully described, the "network test flag" bit used to control the SAC devices and the loopback circuitry for accomplishing on-line maintenance during idle network time slots.

The maintenance interface 18, 40 is also conveniently described as separate units, an "A" unit 18 and a "B" unit 40. The "A" maintenance interface unit 18 permits a test vector to be entered into an idle time slot. The "B" maintenance interface unit 40 provides a destination location for test data. These functions, as well as the remaining circuitry of FIG. 1, will hereinafter be more fully described under the heading "On-line Maintenance."

Figure 2:
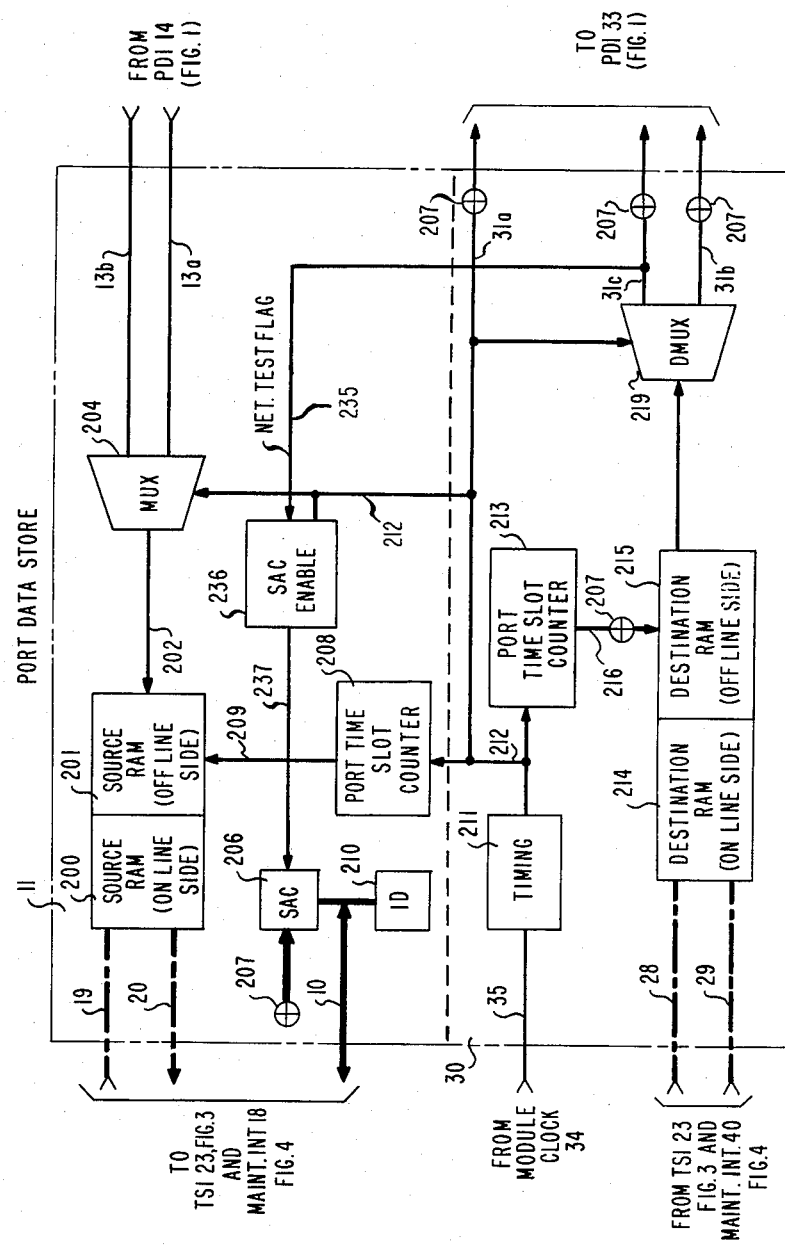

The port data store which has been shown as divided into separate portions 11, 30 is detailed in FIG. 2. Referring to the upper portion 11 of FIG. 2, during each frame multiplexor 204 enters one 16-bit sample from each port received over path 13 into a dedicated location in "offline" source ram 201. This is accomplished under control of timing circuit 211 advancing counter 208 sequentially to designate successive addresses in source ram 201. The "on-line" source ram 200 is at this time being randomly addressed over path 19 by time slot interchanger 23, FIG. 3, executing a dynamically stored program of "move" instructions. The addressed location in ram 200 transfers its contents over path 20 to the arithmetic logic unit 308, FIG. 3, in the time slot interchanger. During the time boundary of each frame, the "on-line" source ram 200 and the "off-line" source ram 201 of the port data store (source) 11 exchange off-line and on-line functions.

Referring to the lower portion of FIG. 2, during each frame demultiplexor 219 of the (destination) portion 33 of port data store serially delivers one sample from destination ram (off-line) 215 to each port. The destination ram (on-line) 214 is at this time being randomly addressed over path 28 by the program of "move" instructions stored in time slot interchanger 23, FIG. 3. The addressed locations in destination ram (on-line) 214 receive the output of arithmetic logic unit 308 of the time slot interchanger over path 29. During the time boundary of each frame, the (on-line) destination ram 214 and the (off-line) destination ram 215 exchange functions.

Figure 3:
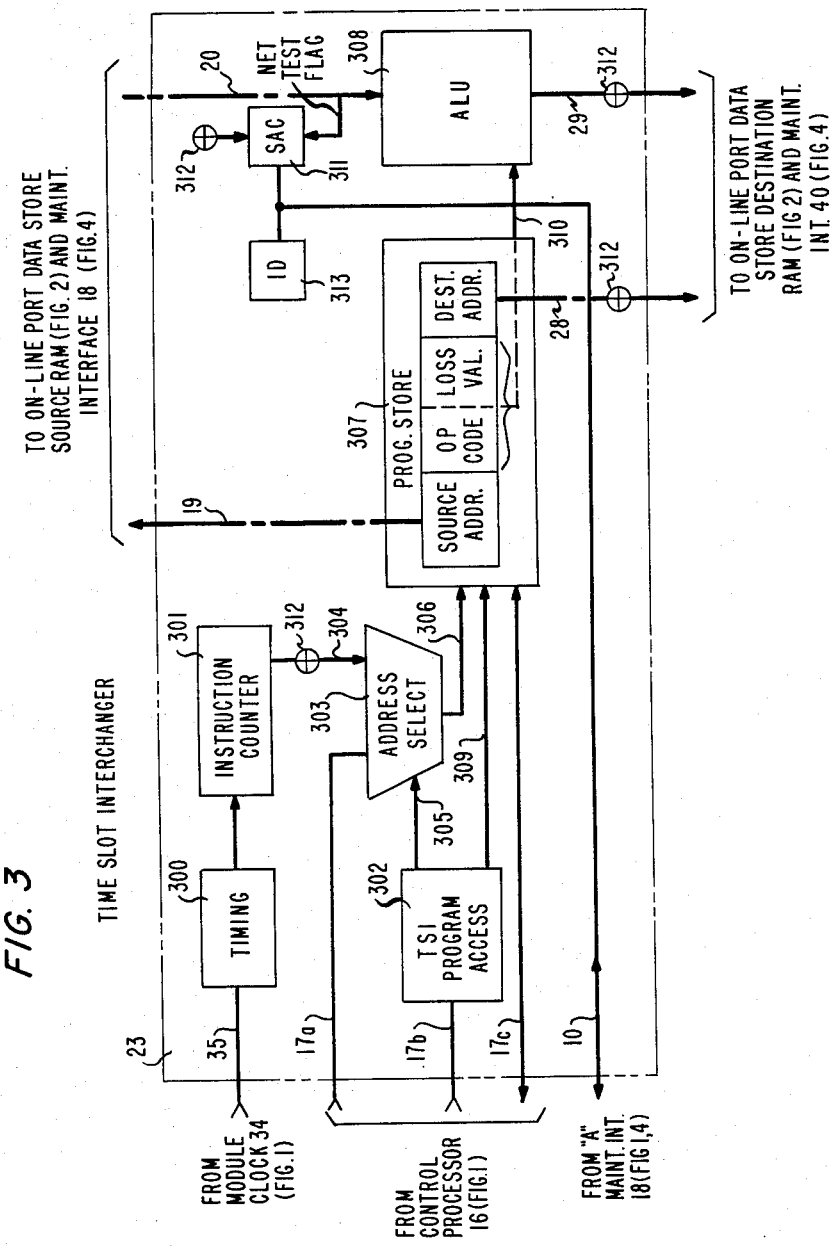

The time slot interchanger 23 is shown in FIG. 3. During any frame time slot interchanger 23 may be reprogrammed by switch control processor 16 furnishing a "move" instruction designating over path 17c the addresses of the port circuit that is the source of time samples and the port circuit that is to be the destination of those samples. The instruction also includes an op-code and a designation of any required attenuation to be applied by arithmetic logic unit 308. The instruction is written into program store ram 307 by the issuance of a write command on read/write control path 17b. The command on path 17b causes access circuit 302 to control address select circuit 305 to accept the program store locations designated by processor switch control 16 on path 17a instead of the instruction counter 301 locations.

When the instructions in program store ram 307 are executed, the absence of a command on path 17b causes address selection circuit to follow instruction counter 301. The instruction designates the address in port data store (source) 11 where the source port's sample is stored and the address in port data store (destination) 30 where the sample is to be sent. During each frame, instruction counter 301 supplies a sequence of instruction addresses via address select circuit 303 to program store ram 307 of the time slot interchanger. Each addressed instruction is then fetched and executed. The address of the source port is placed on the source address path 19 to port data store (source) 11 which returns the voice (or data) sample on source data path 20 to the arithmetic logic unit 308. Arithmetic logic unit 308 executes the op-code provided over path 310 and modifies the sample to insert the degree of loss specified. The voice (or data) sample is then sent over data path 29 to the destination address in port data store 30 designated on path 28.

ON-LINE MAINTENANCE

Figure 6:
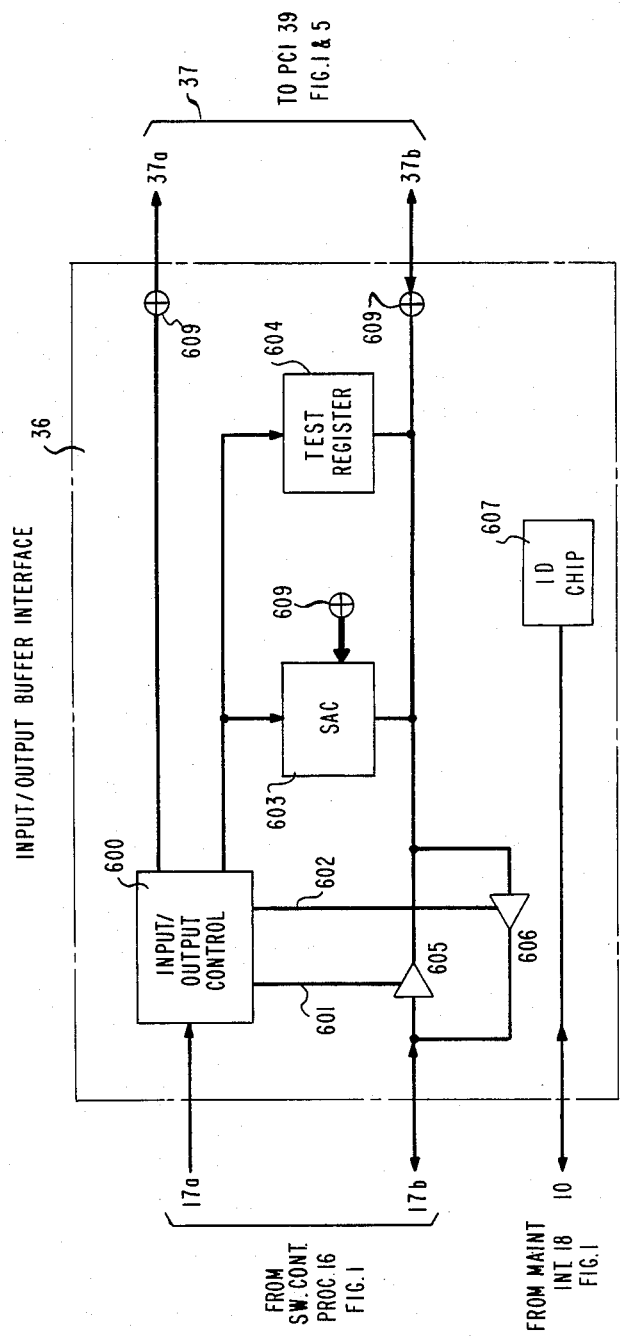

Maintenance of the switching network of FIG. 1 involves detection of faults and their isolation to a circuit "pack". The maintenance activity may most conveniently be illustrated with respect to circuit packs containing port data interface input portion 14, and output portion 33, (FIG. 1), port data store (FIGS. 1 and 2), time slot interchanger 23, (FIGS. 1 and 3), maintenance interface (FIGS. 1 and 4), input/output buffer interface 36 (FIGS. 1 and 6), and port control interface 39 (FIGS. 1 and 5).

In addition to conventional circuitry (not shown) that may advantageously be employed for generating and checking parity on the contents of each location in the time slot interchanger's program store ram 307 (FIG. 3), and on all PCM samples on paths 20, 29 into and out of the time slot interchanger's arithmetic logic unit 308, the principal circuit elements involved in on-line maintenance according to our invention are test vector buffer 407 of the "A" maintenance interface 18 of FIG. 4 and loopback path 24, loopback activate circuit 103, and SAC device 104 of FIG. 1. The maintenance operation involving similar SAC devices 206, 311, 401, 501, 603, employed in FIGS. 2, 3, 4, and 5 will then become apparent. In addition, "ID" chips such as ID chips 108, 210, 313, 410, 510, and 607 are employed to identify circuit pack type and vintage information for field inventory and factory test purposes. ID chips also contain a test register (not explicitly shown) for testing the input/output bus to the circuit pack and LED control circuitry for activating pass or fail lamps (not shown) during demand testing of the system.

In the illustrative embodiment, a normal two-way "conversation" between two port circuits advantageously makes use of two "move" instructions in program store ram 307, each instruction designating a source address (in port data store 11) and a destination address (in port data store 30) together with an "op-code" and a designation of the amount of any required attenuation to be performed by arithmetic logic unit 308. One such instruction takes a sample from the first port circuit to the second port circuit and the other instruction takes a sample from the second port circuit to the first port circuit. Each instruction location in program store ram 307 defines a network "time slot".

Switch control processor 16 accesses port circuits 21 via input/output buffer interface 36 and port control interface 39, to determine whether the port circuits are busy or idle, and to provide (over path 25) alerting signals or ringing. Port circuits 21 that serve only digital terminals also employ SAC devices and loop-back circuitry (not shown, but similar to those which have been illustrated) for detection and isolation of faults. This circuitry is accessed over path 25 and the maintenance techniques employed are the same as those on the Port Data Interfaces.

When processor 16 gives its maintenance programs permission to run a test, processor 16 obtains the locations of a pair of available network time slots in program store ram 307 and obtains the address of one of port circuits 21 that is presently idle.

Referring to FIG. 3, a maintenance connection is established to the idle port by loading two maintenance instruction into program store ram 307 at the locations (network time slots) designed on paths 17a and 306. The instructions to be written are delivered over path 17c. Control of the write operation is via path 309.

If at any time during this maintenance activity call processing functions in processor 16 request the use of the designated idle port, processor 16 immediately aborts the maintenance on this network path and the port is returned to service.

Next, all SACs are cleared. SACs 401 (FIG. 4), 311 (FIG. 3), and 206 (FIG. 2) are cleared by processor 16 via path 17 through "A" maintenance interface unit 18 and over maintenance bus 10. SAC 104 (FIG. 1) is cleared through input/output buffer interface 36 and port control interface 39 via paths 17, 37 and 25. These SACs remain clear until test data containing an active network test flag (FIG. 7) is processed by the network.

To start test data flow into the maintenance connection, processor 16 sends an order via path 17 to test vector buffer 407, FIG. 4 of "A" maintenance interference unit 18. The order causes buffer 407 to make test data available on path 20 when the buffer is accessed on path 19. The test data consists of a list of test vectors, each formatted the same as any non-test, 16-bit time slot sample (FIG. 7) except that the network test flag is on. (Normal calls in the system all have the network test flag off.) Upon receiving an order from processor 16, buffer 407 makes one test vector available to time slot interchanger 23 each time slot frame until the list is completed. Then buffer 407 returns to the mode in which it supplies neutral data samples (idle code) with network test flag off.

The first and the last vectors in the list are designed to convey a sample through the network that is very close to an idle code pattern thereby minimizing the effect on PBX users during both normal and fault conditions. The remaining vectors contain samples to find faults in the conversion of analog speech to PCM code and in the arithmetic logic unit's linear representation of data. Such vectors may advantageously designate samples that describe a triangular wave to reduce noise induced by the vectors.

Each test vector is passed through as though it were just another voice sample on some call processing connection. However, the SAC chips along the test paths accumulate a signature that represents circuit activity while test vectors are being processed. The network test flag in the data stream (paths 20, 29, 31b and 13b, respectively) enables SACs 401, 311, 206 and 104 for the duration of test vector processing.

At the beginning of each frame "A" maintenance interface unit 18 makes the next test vector available to the time slot interchanger 23. Each test vector is available for exactly one frame whether the time slot interchanger uses it or not. The time slot interchanger executes every instruction in program store ram 307, FIG. 3, once per frame.

In executing the first maintenance instruction, time slot interchanger 23, FIG. 3, uses the source address of the instruction to access test vector buffer 407. The address is transmitted to test vector buffer 407, FIG. 4, over path 19. The addressed buffer sends the present test vector over path 20 through arithmetic logic unit 308 of time slot interchanger 23. The destination address of the first instruction then forwards the test vector over path 29 to the location in destination ram (on-line) 214 (FIG. 2) of port data store designated over destination address path 28.

During the next frame, the test vector is taken from the destination ram (off-line) 215 (which, during the previous frame, was the destination ram) (on-line) 214 by demultiplexor 219 and sent in serial fashion along path 31 to port data interface output portion 33, FIG. 1. Loopback activate circuit 103 recognizes the active network test flag on path 31c and loops-back the test vector via paths 24a, 24b to paths 13a, 13b toward port data store (source) 11. The recovered test vector is stored in off-line source ram 201 at the location therein corresponding to the idle port.

In the next frame the second maintenance instruction is executed. The source address of this instruction causes time slot interchanger 23 to address the idle port circuit location in on-line source ram 200 (which, during the previous frame, was the off-line source ram) containing the looped-back test vector. The destination address of the instruction causes the looped-back test vector to be sent via path 29 to test destination register 408 (FIG. 4) of maintenance interface 40 by applying the test register's address over path 28. The test vector has now been propagated by the time slot interchanger over a complete network path.

After the test vector loopback activity is completed, maintenance software in switch control processor 16 may, via the input/output buffer interface 36 and port control interface 39 read the SACs over the bus paths 10, 25 and compare the measured signatures against the expected signatures.

The port data interface units 14, and 33 contains loop-around circuitry that provides the capability for testing complete paths through the switch without interfering with existing call traffic. The network test flag bit on leads 13b and 24b, FIG. 1, (and see FIG. 7) is normally inactive for call traffic. However, for maintenance testing, the test vector samples coming from the test vector buffer of the "A" maintenance interface 18 makes the network test flag bit active. Loopback activate circuit 103 monitors lead 24b whenever the start of sample signal is presented by timing and port addressing circuit 109 on lead STOS. If the network test flag is active, loopback activate circuit 103 energizes path 102 to disable gates 100a and 100b and to enable gates 101a and 101b. Path 102 is energized just long enough for one maintenance sample to be "looped around" from leads 27a and 24a through gate 101a to lead 13a and from leads 27b and 24b through gate 101b to lead 13b. Since the time slot in which the maintenance samples are traveling is dedicated to a port known to be idle, this maintenance activity does not interfere with call traffic. However, the circuitry associated with reception of data and/or PCM voice samples from ports 21-1, 21-8 is tested effectively. The loopback path (31, 24, 101, 13) allows test data reaching the port data interface in lead 31 to be returned to maintenance interface 40 along the incoming switch path (13, 11, 20, 23, 29, 40) from a port so that the entire switch loop to that port address can be tested. SAC device 104, FIG. 1, monitors group circuit points internal to or at the output of a circuit pack and accumulates a cyclic redundant check (CRC) signature representing the processing of test data by the circuit pack. SAC device 104 is enabled by SAC enable circuit 105 when the STOS signal is delivered by port addressing and timing circuit 109 incident to the start of a new PCM sample on leads 13b, 13c. SAC enable circuit 105 will then accept the network test flag applied at its upper input and if the network test flag is active, SAC 104 is enabled to accumulate a signature on the serial data appearing on paths 13a, 13b for the duration of the time that the PCM sample is present.

In FIG. 2 a similar SAC enable circuit 236 is required to enable SAC 206 for the duration of time that PCM samples arriving at dmux 219 in parallel are shifted out serially to the port data interface. More particularly, when timing circuit 211 applies a signal on path 212 indicating that a new PCM sample is available on path 31c, SAC enable 236 accepts the network test flag appearing on path 235. If the network test flag is active, SAC 206 is enabled over path 237 and then monitors all points cross-marked 207, i.e., SAC 206 accumulates a signature on the serial data appearing on paths 31a, 31b, 31c, for the duration of time that the PCM sample is serially shifted out to the port data interface as well as the parallel data appearing on path 216. The SAC devices 311, 401, 501 and 603 of the other figures monitor parallel data and thus do not require SAC enable circuits such as 105 and 236.

Thus far, on-line maintenance of a network path has been described. If a fault occurs in address select circuit 303 of the time slot interchanger (FIG. 3), the address designated on path 306 will be incorrect and instructions will be written into incorrect locations in program store 307. Therefore, during the maintenance operations described above the two maintenance instructions would be written into the wrong locations of the arm. The instruction counter 301 generates consecutive addresses starting at 0 which determine which instruction to execute next. In this fault example some instruction counter value other than the expected value would cause the maintenance instruction in program store to be accessed. Since the output 304 of the instruction counter 301 is a cross-point 312 monitored by SAC 311, the signature accumulated will not agree with the expected value. All other SACs would be correct because the instructions were still executed. Therefore the time slot interchanger would be indicated as the fault source.

For another example, assume port timing path 26 is faulty. This path 26 is monitored by SAC 104. SAC 104 would not contain the expected signature, but other SACs would be correct, and therefore, the port data interface is identified as having a fault condition.

A more complex example assumes destination ram 214 (on-line) of port data store 30, FIG. 2, has a faulty memory bit. In this case, SACs 206, (FIG. 2), 104, (FIG. 1) and 311, (FIG. 3) would each monitor the incorrect data while SAC 401, (FIG. 4) would be correct. An isolation test is then run in which the port data store (destination) 30 is inhibited via path 28 from receiving test vectors. After SAC 311 is cleared and the test vector buffer is run again, SAC 311 may be checked and will be found to be correct. Therefore the port data store is indicated as the source of the fault.

In one final example, assume gate 507 of the port control interface, FIG. 5, is faulty. Even though gate 507 is in the port control path 25b, 37b, a test of the PCM path through the switch is effective to detect a faulty gate 507. This may be explained as follows: During the PCM path testing, SAC 104 of port data interface (input portion) 14, FIG. 1, accumulates a signature representing the activity on the port data interface when a network test flag is present. After the completion of network test flag activity, the switch control processor 16, FIG. 1, reads the signature accumulated in SAC 104 over path 25, 37, 17. The signature is read through faulty gate 507, thus causing the accumulated signature to be corrupted. Switch control processor 16 compares the corrupted signature with the expected signature and finds the signature to be incorrect. During this same PCM path test, switch control processor 16 also reads signatures from SACs 401, 311, and 206 via path 10, 17 and finds those signatures to be correct. Whenever these symptoms of a fault appear, switch control processor 16 runs a "simple bus test," to determine if the fault is in the PCM circuitry on port data interface units 14, and 33 or is located along the port control path 25, 37, 17. In accordance with this simple bus test, the switch control processor writes the signature it expected to read from SAC 104 into a test register (not explicitly shown) within ID chip 108 on port data interface 14, FIG. 1, via path 17, 37, 25. The switch control processor 16 then reads the test register over the same path originally used to read SAC 104, namely path 25, 37, 17 which contains faulty gate 507. Now faulty gate 507 corrupts the data read from the test register in the same manner that gate 507 corrupted the data read from SAC 104. The fault is therefore identified as a port control path fault.

In order to isolate the fault further, a port control bus test may be run. This test proceeds as follows: SAC 501 is cleared by switch control processor 16 sending a clear order over path 17, 37 to SAC 501. Next, SAC 501 is enabled by switch control processor 16 sending an enable order over the same path. Switch control processor 16 then sends a series of writes to ID chip 108 on port data interface 14. During the series of writes, SAC 501 is accumulating a signature representing addressing, control and data flow on the port control interface 39. During the time the series of writes is being performed, switch control processor 16 disallows any normal call processing activity of the port control path 17, 37, 25 undergoing test. Switch control processor 16 then sends a disable order to SAC 501. SAC 501 is then read and its signature will appear incorrect because faulty gate 507 corrupts the data read from SAC 501. Thus the port control interface 39 is indicted.

In the illustrative embodiment, it has been assumed that program store 307 of the time slot interchange employed two separate locations for on-line maintenance instructions. It should be apparent that different instruction configurations are possible depending on the particular hardware and software architectures selected. Further and other modifications will be apparent to those skilled in the art and may be implemented without, however, departing from the spirit and scope of our invention.

What is claimed is:

1. A switching system adapted to establish time division connections among a plurality of port circuits via individual time slot paths, comprising:
   means for transporting a test vector along a selected one of said time slot paths, and
   a plurality of signature analysis means disposed along said selected path, each of said signature analysis means being operative for providing a signature analysis of said test vector, whereby the location of a fault along said selected path can be determined by comparing each provided signature analysis with an expected signature analysis.

2. A switching system for establishing time division connections among a plurality of port circuits via individual time slot paths, comprising:
   means for normally transporting digital samples between active ones of said port circuits,
   means for transporting a test vector along a selected one of said individual time slot paths,
   a plurality of signature analysis means disposed along said selected one of said individual time slot paths,
   maintenance means for activating said signature analysis means to respond to said test vector, each of said signature analysis means being operative for outputting a signature analysis of said test vector, and
   means responsive to each outputted signature analysis of said test vector for locating a fault along said selected one of said individual time slot paths.

3. A switching system according to claim 2 wherein said maintenance means for activating said signature analysis means includes means for causing said digital samples transporting means to transport a network test flag to an idle one of said port circuits.

4. A switching system according to claim 2 wherein said switching system further comprises:
   a source store having an addressable location allocated to each of said port circuits, and
   a destination store having an addressable location allocated to each of said port circuits.

5. A switching system according to claim 4 wherein said means for transporting comprises:
   means for selectively storing said samples and said test vector in said addressable locations.

6. A switching system according to claim 4 wherein said switching system further comprises,
   program store means for storing the address of a predetermined set of said addressable locations and
   program store cycle means for causing said program store to cycle through said set of locations.

7. A switching system according to claim 6 further comprising signature analysis means associated with said program store cycle means.

8. A switching system according to claim 7 wherein said maintenance means includes means for activating said signature analysis means associated with said program store cycle means.

9. A switching system according to claim 8 wherein said means for activating said signature analysis means includes switch processor means, and means controlled by said processor means for ascertaining the active and idle states of said port circuits.

10. A port data interface for serving a plurality of port circuits comprising:
   a first path for transporting samples outgoing from said plurality of port circuits,
   a second path for transporting samples incoming to said plurality of port circuits,
   means selectively controlled by a signal pattern contained in one of said samples for connecting said first and second paths together,
   a plurality of signature analysis means associated with one of said paths, and
   means controlled by said signal pattern for activating at least ones of said signature analysis means, each of said signature analysis means being operative for outputting a signature analysis of said samples containing said signal pattern.

11. A port data interface according to claim 10 further comprising:
   means for individually accessing said port circuits,
   wherein said means for activating said signature analysis means is jointly controlled by said signal pattern and said means for individually accessing said port circuits.

12. A method of conducting on-line maintenance in an operating switching system comprising the steps of
   detecting the presence of an idle time slot,
   inserting a test vector in said idle time slot, and
   providing an alerting signal to a plurality of signature accumulating devices to respond to said test vector during said idle time slot and collecting the response of each of said signature accumulating devices to said test vector to determine the location of a fault within said switching system.

13. The method of claim 12 further comprising the steps of detecting the occurrence of a service request during said idle time slot, and
   removing said alerting signal to cause switching system to respond to said service request.

* * * * *